(12) United States Patent
Alenezi

(10) Patent No.: US 8,890,342 B2
(45) Date of Patent: Nov. 18, 2014

(54) AIR POWERED ELECTRICAL GENERATOR

(76) Inventor: Sami Mohammed Alenezi, Algahra (KW)

( * ) Notice: Subject to any disclaimer, the term of this patent is extended or adjusted under 35 U.S.C. 154(b) by 136 days.

(21) Appl. No.: 13/586,004

(22) Filed: Aug. 15, 2012

(65) Prior Publication Data
US 2014/0049047 A1 Feb. 20, 2014

(51) Int. Cl.
*H02K 7/18* (2006.01)
*H02K 53/00* (2006.01)

(52) U.S. Cl.
USPC ......................................... 290/1 A

(58) Field of Classification Search
CPC .................................... H02K 7/1823
USPC ......................................... 290/52
See application file for complete search history.

(56) References Cited

U.S. PATENT DOCUMENTS

| | | | |
|---|---|---|---|
| 3,925,984 A | 12/1975 | Holleyman | |
| 5,163,292 A | 11/1992 | Holleyman | |
| 5,296,799 A * | 3/1994 | Davis | 322/35 |
| 5,606,233 A * | 2/1997 | Davis | 318/142 |
| 6,236,185 B1 | 5/2001 | Hines et al. | |
| 7,468,564 B2 | 12/2008 | Crisafulli | |
| 2007/0182158 A1* | 8/2007 | Cerney et al. | 290/40 C |
| 2007/0296222 A1* | 12/2007 | Blackman | 290/1 A |
| 2010/0013177 A1* | 1/2010 | Horn, Jr. | 280/47.24 |
| 2010/0148518 A1* | 6/2010 | Algrain | 290/1 R |

* cited by examiner

*Primary Examiner* — Tulsidas C Patel
*Assistant Examiner* — Sean Gugger
(74) *Attorney, Agent, or Firm* — Lowe Hauptman & Ham LLP

(57) ABSTRACT

An air powered electrical generator includes an air compressor, an electrical motor for powering the air compressor and a compressed air storage tank. A fan, a valve and a pipe direct released air onto the fan to thereby rotate the fan and two electrical generators. A battery and a battery charger provide power for the electric motor so that the air powered electric generator can be moved to a pre-selected location to provide electric energy in a manner that is free of carbon monoxide and pollution.

1 Claim, 1 Drawing Sheet

AIR POWERED ELECTRICAL GENERATOR

FIELD OF THE INVENTION

This invention relates to an air powered electrical generator and more particularly to a modular air powered electrical generator that includes a modular frame and means for moving the air powered electrical generator from one location to another location.

BACKGROUND FOR THE INVENTION

Compressed air powered plants are known and have been in use for many years. For example, a compressed air powered plant for land, air and marine vehicles is disclosed in a Holleyman U.S. Pat. No. 3,925,984. As disclosed therein the compressed air power plant is efficient and pollution free and operates on compressed air from tanks that are replenished by a battery powered air compressor.

A more recent U.S. Pat. No. 5,296,799 of Davis discloses an electric power system wherein the electric power system has an air compressor unit with a reservoir tank, an air powered motor and an electric generator. The air compressor unit has an air compressor that provides compressed air to the reservoir tank. The air compressor is driven by an electric motor. The air powered motor is driven by compressed air from the reservoir tank and provides rotary power to an input shaft of an electric generator wherein the generator produces electrical power. The system can be mounted on a mobile platform for ease of transport. Also, storage batteries can be connected to the electric output of the generator. The output of the batteries can then be connected to the electric motor of the air compressor unit.

A further approach to an air turbine generator is disclosed in a U.S. Pat. No. 7,468,564 of Crisafulli. As disclosed an electrical power supply system comprises an air powered alternating current electrical generator in which pressurized air from a single source is used to drive an air turbine secured on the shaft of the alternating current electrical generator. One uncontrolled nozzle continuously directs air from the single source to the air turbine. At least a second controlled nozzle directs air from the single source and a solenoid controlled shut off valve is placed in a conduit between the source of compressed air and the second nozzle.

Notwithstanding the above it is presently believed that there is a need and a potential commercial market for an improved air powered electrical generator in accordance with the present invention. There should be a need because the air powered electrical generator in accordance with the present invention is relatively compact, and can be used in a confined space without generating carbon monoxide or other forms of pollution. Further, it is believed that such generators can be produced at a competitive price, are relatively rugged of relatively simple design and capable of producing electricity for a variety of uses at a reasonable cost.

BRIEF SUMMARY OF THE INVENTION

In essence the present invention contemplates an air powered electrical generator that includes an air compressor, an electrical motor for driving the air compressor and a compressed air storage tank for receiving and storing compressed air from the air compressor. A fan and means for releasing a quantity of compressed air and for directing the released compressed air into or onto the fan. First and second electrical generators, a battery for powering the motor, a battery charger and power output and a gear assembly driven by the fan rotate the first and second electrical generators wherein the first of the electrical generators supplies power to the power output and a second of the electrical generators powers the battery charger for recharging the battery.

The invention will now be described in connection with the accompanying drawing wherein like reference numerals have been used to indicate like parts.

DESCRIPTION OF THE PREFERRED EMBODIMENTS OF THE INVENTION

Figure 1:
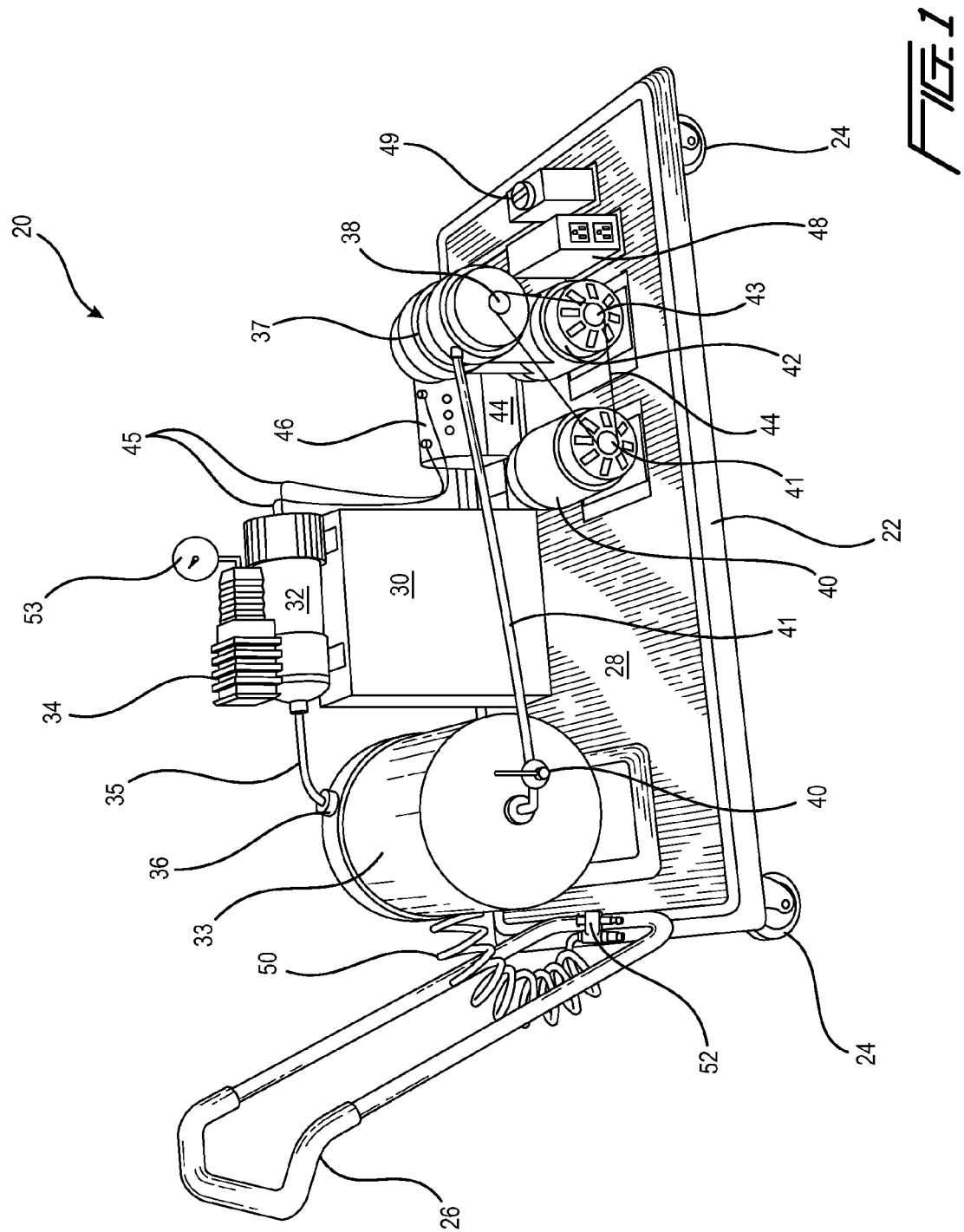
FIG. 1 is a schematic illustration of an air powered electrical generator in accordance with a preferred embodiment of the invention.

As shown in FIG. 1, an air powered electrical generator 20 includes a modular frame 22 mounted on a plurality of wheels 24 and guided by a handle 26 on a rear upper portion of the frame 22. The frame preferably includes a plate like floor structure 28 with a support 30. The support 30 serves as a base for an air compressor 32 and motor 34 for driving the air compressor 32.

The air compressor 32 is a commercially available compressor of a conventional design and is operatively connected to a conventional electric motor 34 and to a compressed air storage tank 33 by a pipe 35 and a one-way valve 36. The one-way valve 36 allows compressed air to enter the storage tank 33 but does not permit flow in the opposite direction.

The storage tank 33 is also operatively connected to an integral fan and gear assembly 37 and 38 respectively that includes a turbo fan and first gear as well as a valve 40 and pipe 41. When the valve 40 is open, compressed air flows through the pipe 41 and into the fan 37 to rotate the fan 37 and gear 38 or pulley wheel that is keyed to the same shaft as the fan 37. A pair of electrical generators 40 and 42 each include a pulley wheel or gear 41 and 43 and are operatively connected to the gear 38 and driven thereby by a drive chain 44 or belt. The generator 40 and 42 are mounted on the plate 28.

The air powered electrical generator 20 also includes a battery 44 and battery charger 46 for charging the battery 44. The battery 44 is connected to and powers the compressor 32 and motor 44 by a pair of electrical leads 45 in a conventional manner. A conventional electrical outlet 48 is connected to the generator 42 while a master switch 49 can be used to shut down and/or activate the air powered generator 20. An output hose 50 connects an air pressure output valve assembly 52 to the storage tank for compressed air. A pressure gauge 53 is shown at the output of the air compressor 32 but would preferably be connected to the compressed air storage tank 33 to maintain a pre-selected pressure therein.

The compressed air powered electrical generator 20 may be adapted to a land vehicle such as an auto or marine vehicle such as a small yacht or cabin cruiser for providing a source of electricity for various uses. The normal controls for an auto would be on the dash board or for a boat on the control panel all of which may be powered by a 12 volt battery.

In the operation of the air powered electrical generator 20 as applied to a water vehicle assumes that the storage tank 33 is empty and the battery or batteries fully charged. The air compressor 32 which may be powered by one of a 36 volt power pack is turned on by the master switch 49. then when the pressure in the tank 33 reaches about 150 psi or other pre-selected pressure, an air pressure switch (not shown) cuts off the electric motor 34. Also, when the pressure drops to about 125 psi the air pressure switch being response to the pressure in pipe 35 or tank 33 automatically turns the motor back on.

Compressed air from the storage tank 33 flows through the valve 40 and pipe 41 to rotate the turbo fan 37 and thus rotates a gear 38 or pulley that rotates a chain 44 then rotates gears 41 and 43 to generate electricity by generators 40 and 42. By utilizing compressed air to generate electricity, no air pollution or even more important no carbon monoxide is created by the operation or at the location of operation. Thus the system is particularly useful in areas or circumstances where carbon monoxide and air pollution are undesirable or unacceptable. Furthermore, by charging the tank with air using a battery or power from an outlet reduces air pollution as compared to the use of portable generators that use an internal combustion engine. Therefore, the system in accordance with the present invention reduces problems associated with carbon monoxide and other pollution.

A system in accordance with a preferred embodiment of the invention operates as follows. The air compressor 32 is operated by the motor 34 using power from the battery or batteries 44 to fill the storage tank 33. Once the storage tank has been filled, the air compressor unit can be stopped. Alternatively, the system can be started by plugging the air compressor unit 20 into an electrical wall outlet (not shown) by a power cord (not shown) for a sufficient time to fill the storage with compressed air. Once the storage tank has been filled, the air compressor 13 is turned off. The system can then be moved to the desired location by means of the wheels 24. When the need arises to provide electricity, compressed air is allowed to flow through the valve 40 and pipe 41 by opening the valve 40 through the turbo fan 37 causing the air to rotate the fan. The fan is keyed to a gear 38 or pulley and rotates a belt 44 that in turn rotates gears or pulleys 41 and 43 to rotate generators 40 and 42 to produce electricity. The generator 40 charges the storage battery 44 by means of a charger 46. Electrical power is tapped from the storage battery to drive a load. The system can operate a DC load or an AC load by using the generators or other conventional means. A portion of the electrical power of the battery 44 is used to operate the air compressor pump 34 to maintain compressed air inside of the storage tank 33. Use of this arrangement allows the provision of electrical power for an extended period of time. Alternatively, the generators 40 and 42 can directly drive the motor 34 for the air compressor 32. The generator drives the motor 23 such as another electric motor. The load motor could for example be used to power a vehicle such as an electric utility vehicle without producing carbon monoxide or pollution as commonly done by internal combustion engines.

While the invention has been described in connection with its preferred embodiment it should be recognized that changes and modifications may be made therein without departing from the scope of the appended claims.

What is claimed is:

1. An air powered electrical generator, consisting of:
   a portable modular frame having a support surface on one side and a plurality of wheels on an opposite side; said portable modular frame having a handle attached to one end thereof;
   an electric motor; an air compressor operably connected to said electric motor and supported on a support member on said support surface;
   a compressed air storage tank supported on said support surface and connected to said air compressor with a pipe;
   a battery disposed on said support frame and operably connected to said electric motor;
   a turbo fan operably connected to said compressed air storage tank with a second pipe;
   a first electrical generator and a second electrical generator supported on said support frame;
   a first gear rotatable by said turbo fan; a second gear rotatable by said first generator;
   and a third gear rotatable by said second generator;
   a belt drive for operably connecting and rotating said first, second, and third gears;
   a battery charger and power output operably connected to said second electrical generator for charging said battery;
   an electrical power outlet connected to said first electrical generator; and,
   a master switch for turning the air powered electrical generator on and off.

* * * * *